(12) United States Patent
Lillbacka et al.

(10) Patent No.: US 7,322,435 B2
(45) Date of Patent: Jan. 29, 2008

(54) SNOWMOBILE SUSPENSION SYSTEM

(75) Inventors: Jorma Lillbacka, Kauhava (FI); Pekka Lillbacka, Kauhava (FI)

(73) Assignee: Lillbacka Powerco Oy, Harma (FI)

( * ) Notice: Subject to any disclaimer, the term of this patent is extended or adjusted under 35 U.S.C. 154(b) by 1693 days.

(21) Appl. No.: 09/836,199

(22) Filed: Apr. 18, 2001

(65) Prior Publication Data
US 2005/0274559 A1 Dec. 15, 2005

Related U.S. Application Data

(62) Division of application No. 09/065,557, filed on Apr. 24, 1998, now Pat. No. 6,253,867.

(51) Int. Cl.
*B62M 29/00* (2006.01)
*B60G 17/04* (2006.01)

(52) U.S. Cl. .............................. 180/193; 280/124.159; 280/6.157

(58) Field of Classification Search ................. 280/5.5, 280/5.514, 6.157, 6.159, 124.159; 180/193, 180/9.5, 9.52; 293/103; 248/676
See application file for complete search history.

(56) References Cited

U.S. PATENT DOCUMENTS

| | | | | |
|---|---|---|---|---|
| 3,183,016 A | * | 5/1965 | Gustafsson | 280/6.156 |
| 3,189,116 A | * | 6/1965 | Steffen | 180/9.5 |
| 3,765,498 A | * | 10/1973 | Rogerson | 180/190 |
| 3,856,099 A | * | 12/1974 | Bowers | 180/193 |
| 3,863,727 A | * | 2/1975 | Michrina | 180/9.5 |
| 3,974,890 A | * | 8/1976 | Noble | 180/190 |
| 4,593,921 A | * | 6/1986 | Marier | 280/21.1 |
| 4,826,260 A | * | 5/1989 | Plourde | 305/120 |
| 5,201,384 A | * | 4/1993 | Kiyota et al. | 180/219 |
| 5,533,586 A | * | 7/1996 | Thompson | 180/193 |
| 5,586,781 A | * | 12/1996 | Anderson | 280/124.159 |
| 5,692,579 A | * | 12/1997 | Peppel et al. | 180/190 |
| 6,217,010 B1 | * | 4/2001 | McNeely | 267/64.16 |
| 6,240,348 B1 | * | 5/2001 | Shono et al. | 701/37 |

* cited by examiner

*Primary Examiner*—Lesley D. Morris
*Assistant Examiner*—Daniel Yeagley
(74) *Attorney, Agent, or Firm*—Louis Woo

(57) ABSTRACT

To enable a rider to control in real time the type of ride he desires, a snowmobile is equipped with a suspension system that includes at least one fluid actuated device which can be adjusted in real time to control the relative distance between the body of the snowmobile onto which the rider sits and the frame, or the slide tracks about which the drive belt is mounted. By setting a constant predetermined desirable distance between the body and the slide tracks, or the frame, of the snowmobile, an optimal cushioned ride for the rider is obtained. The control of the fluid actuated device(s) may be effected at any time manually by the rider, or be effected by a feedback system. The snowmobile is also equipped with an ABS system for enhancing the traction of the drive belt on snow and therefore the control of the snowmobile by the rider.

13 Claims, 5 Drawing Sheets

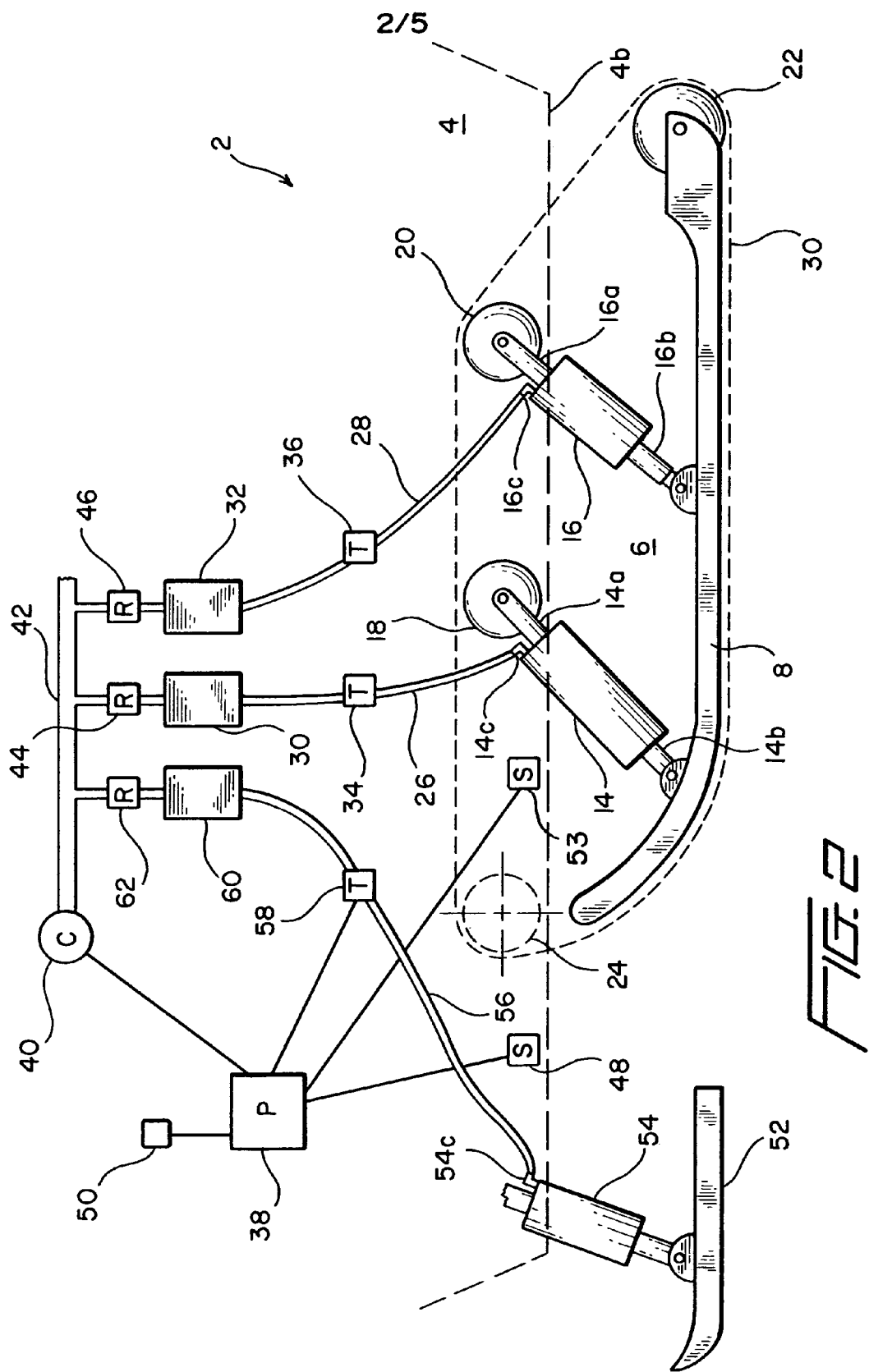

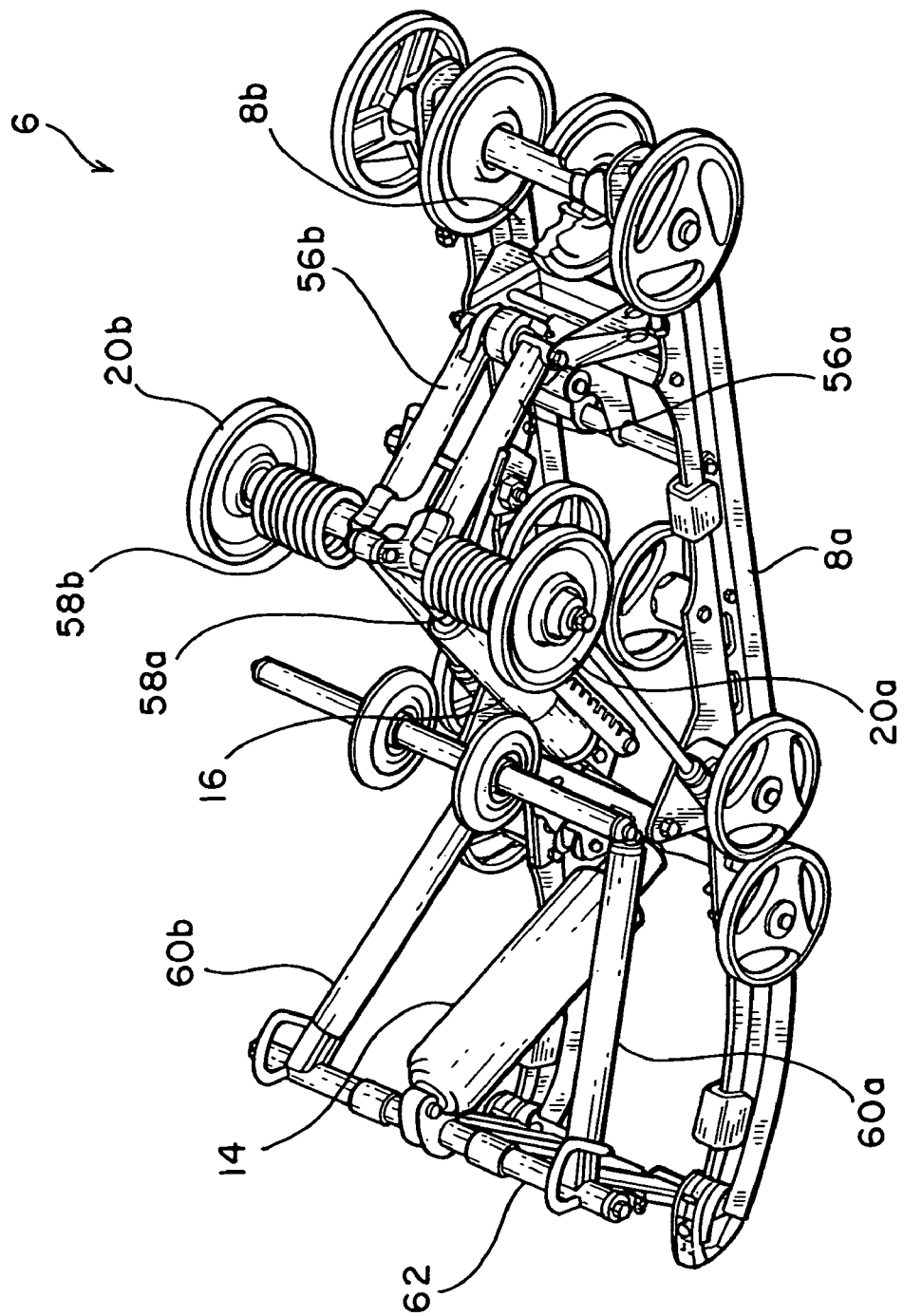

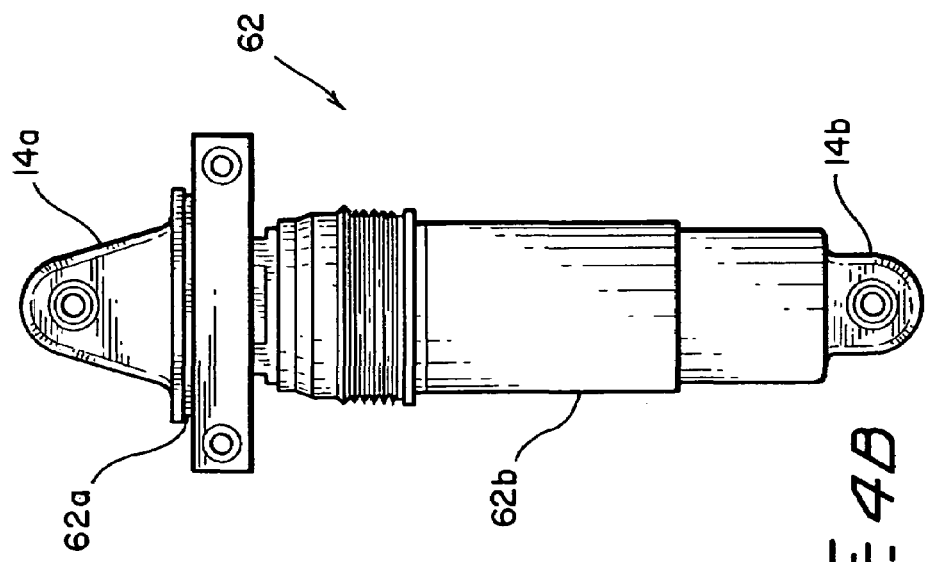
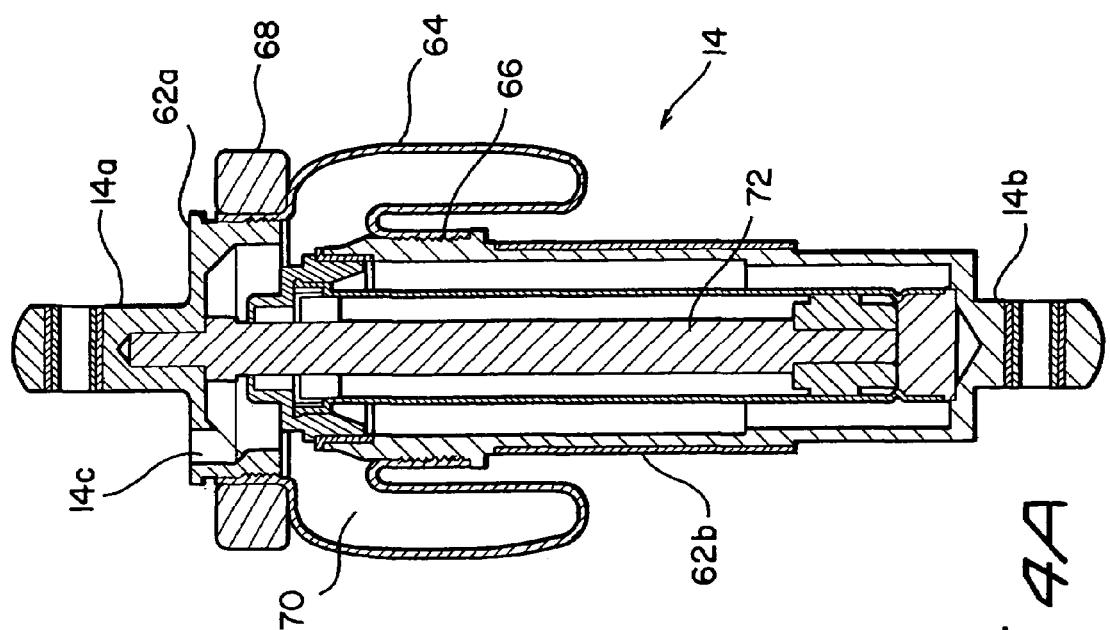

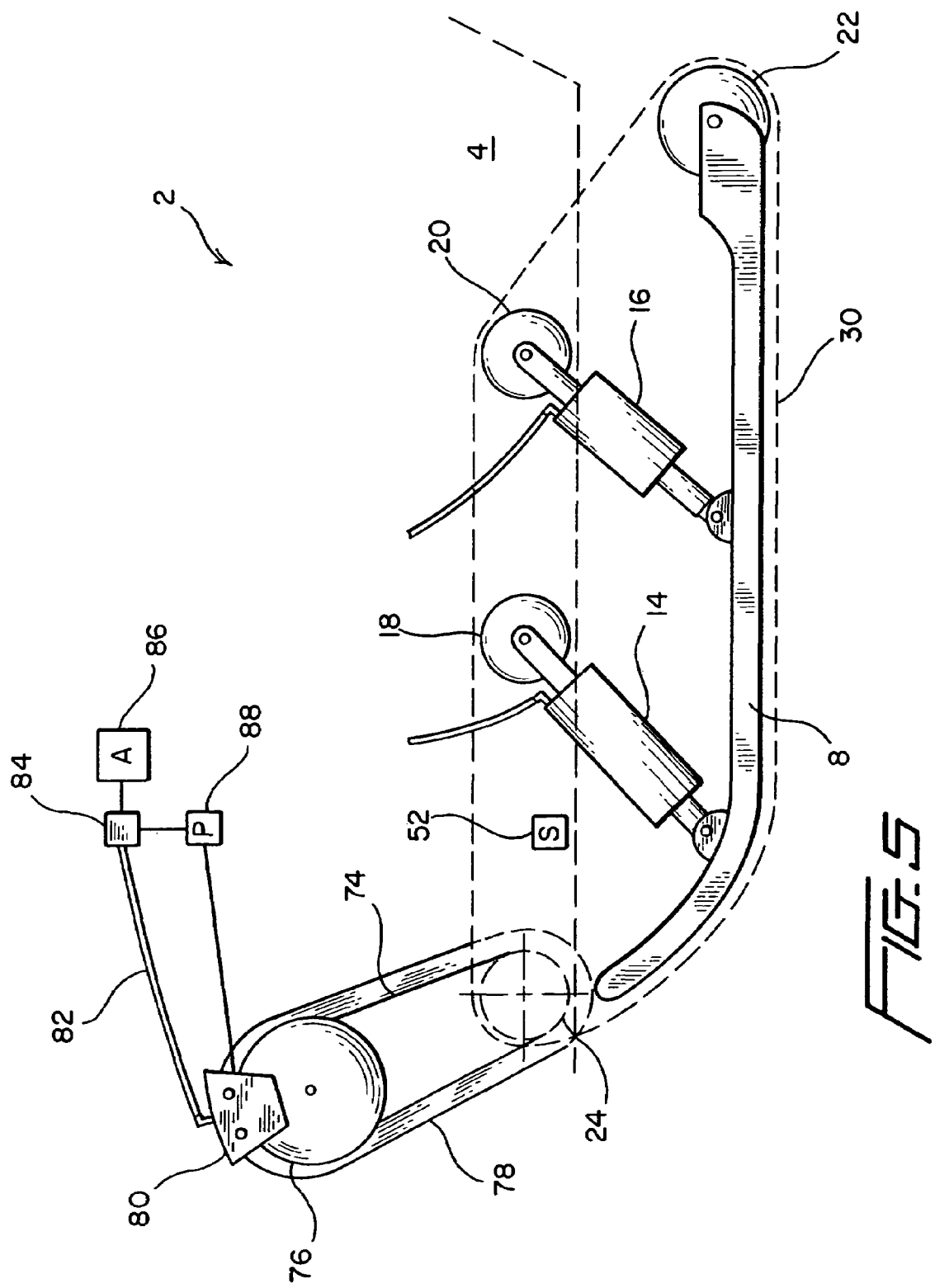

SNOWMOBILE SUSPENSION SYSTEM

RELATED APPLICATIONS

This is a divisional of application Ser. No. 09/065,557 filed Apr. 24, 1998, now U.S. Pat. No. 6,253,867.

FIELD OF THE INVENTION

The present invention relates generally to snowmobiles and more particularly to a suspension system that provides a controlled cushioned ride for riders of the snowmobile.

BACKGROUND OF THE INVENTION

To compensate for the ruggedness of the terrain, a conventional suspension system for a snowmobile includes a pair of shock absorbers, and associated springs, for supporting the frame of the snowmobile. Such suspension system is usually not adjustable. Thus, if persons of different weights, or for that matter if more than one person, were to ride on the same snowmobile, the ride would become choppy and the steering of the snowmobile becomes less responsive. Such unresponsiveness in the steering and choppiness in the ride detract from the rider the pleasure of driving or riding a snowmobile.

The fact that the conventional suspension system of snowmobiles is unable to adjust on a real time basis means that a rider has to stop the snowmobile, turn off the engine for safety sake and manually adjust the stiffness or tension provided by the shock absorbers of the snowmobile, if indeed such shock absorbers were adjustable. But adjusting the conventional suspension system for one environment means that the rider has to readjust the suspension system when the snowmobile is ridden in a different environment, as the suspension system, once set, remains set at that tension or stiffness, until readjustment.

SUMMARY OF THE INVENTION

To provide a smooth or cushioned ride for a rider of the snowmobile and also the ability of the rider to adjust at any time the stiffness of the ride, at least one but most likely a plurality of fluid actuated devices are interposed between the body and the frame of the snowmobile. These fluid actuated devices could be hydraulic or gas driven cylinders controlled either manually by the rider or automatically by a feedback circuit.

For supplying fluid—which per the instant invention encompasses air; gas, hydraulic oil and other incompressible fluids—to the fluid actuator devices, valve mechanisms which may include throttle valves and pressure regulators are used. To provide the necessary pressure, a compressor is used. The fluid is stored in one or more fluid containers or reservoirs, which are communicatively connected to the fluid actuator devices by fluid conduits. The throttle valves and pressure regulators provide the necessary regulation of the amount of fluid supplied to the fluid actuated devices. And depending on the kind of stiffness the rider desires, different amounts of fluid may be provided independently to each of the plurality of fluid actuated devices. The amount of fluid supplied to each of the fluid actuated cylinders can vary, as fluid compensation may vary for each of the cylinders.

The fact that the stiffness of each of the fluid actuated cylinders can be adjusted means that riders of different weights may each comfortably ride on the same snowmobile. And for those instances where there are more than one rider, the riding comfort of the snowmobile is not decreased insofar as the cushioning ability of the fluid actuated cylinders can be adjusted for the increased weight.

To free the rider the need to manually adjust the fluid actuated devices, a feedback circuit including a sensor and a processor may be used for obtaining the optimal cushioned ride for the rider. One way in which the optimal cushioned ride may be obtained is by the sensor monitoring the distance separating the slide tracks of the snowmobile which come into contact with the terrain and the body of the snowmobile which is mounted to a frame to which the slide tracks are coupled. By maintaining a given distance which could be ascertained empirically, and controlling the fluid actuated cylinders to raise or lower the body of the snowmobile relative to its frame or slide tracks, the optimal cushioned ride can be maintained.

The same type of fluid actuated cylinder could be used to connect the skis to the body of the snowmobile so that better controlled and more stabilized steering is achieved.

To provide yet better handling and control, the snowmobile of the instant invention is equipped with an anti-lock braking system (ABS).

It is therefore an objective of the present invention to provide a new and improved suspension system that gives a rider of a snowmobile an optimal cushioned ride.

It is yet another objective of the present invention to provide each rider of the instant invention snowmobile the ability to control the type of ride he desires, either manually or automatically.

It is yet another objective of the present invention to provide each rider of the instant invention snowmobile the ability to control the type of ride he desires, either manually or automatically.

It is moreover another objective of the present invention to provide a snowmobile with a controlled and stabilized steering system.

It is still another objective of the present invention to provide a snowmobile with improved handling abilities by equipping the same with an ABS brake system.

BRIEF DESCRIPTION OF THE FIGURES

The above-mentioned objects and advantages of the present invention will become apparent and the invention itself will be best understood by reference to the following description of the present invention taken in conjunction with the accompanying drawings, wherein:

FIG. 2 is a simplified illustration of the instant invention;

FIG. 3 is a perspective view of the frame and slide tracks illustrating an embodiment of the instant invention;

FIG. 4a is a cross-sectional cut-away view of an exemplar fluid actuated device of the instant invention;

FIG. 4b is a side view of the exemplar fluid actuated device of the instant invention sans the rubber isolator; and FIG. 5 is a simplified schematic illustrating the addition of an ABS braking system to the instant invention vehicle.

DETAILED DESCRIPTION OF THE INVENTION

Figure 1:
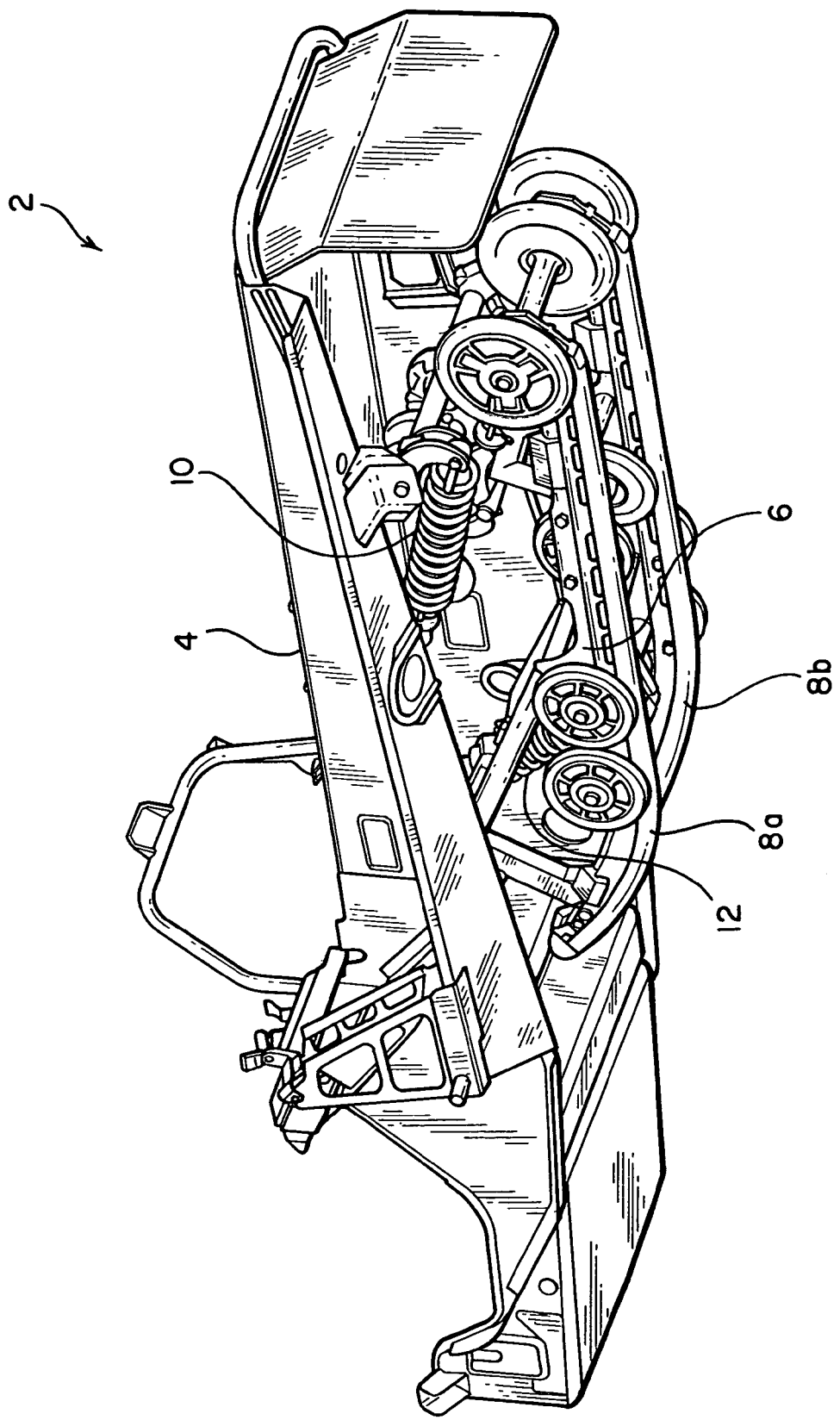
FIG. 1 is a perspective view of the basic body and frame of a conventional snowmobile being used for illustrating the instant invention.

Stripped of all components not required for the understanding of the instant invention, an exemplar snowmobile showing only the body and the frame attached thereto is shown in FIG. 1. As illustrated, snowmobile or vehicle 2 has a body 4 mounted to a frame 6 by way of a number of connecting links and struts. Fixedly coupled to frame 6 are two slide tracks 8a and 8b about which a belt, not shown, is mounted. As is well known, the belt is driven by at least one wheel, which in turn is driven by a belt or gears from a transmission, shown in FIG. 5, which movement is driven by an engine, not shown for the sake of simplicity in illustration. Thus, when driven, the belt is guided by slide tracks 8a and 8b, as well as guide wheels, and rotates about the frame of snowmobile 2 such as for example shown by the dotted line 30 in FIG. 3.

Also shown in FIG. 1 are a number of shock absorbers 10 and 12 interposed between body 4 and frame 6 for providing a smoother ride for a rider of the snowmobile. The problem with such conventional support provided by shock absorbers 10 and 12 is that those shock absorbers are not adjustable and thus if the weight of the rider, or riders, exceeds a certain predetermined weight, body 4 of the snowmobile tends to sag onto frame 6, and any irregularity on the path would cause body 4 to bump against frame 6, thereby providing a not so comfortable ride for the rider. Further, given the one for all mentality of the prior art suspension system for snowmobiles, different riders of the same snowmobile may feel differently when the snowmobile is in movement, and thereby possibly causing uneven handling of the snowmobile which may lead to potential accidents.

The shock absorbers of some snowmobiles do allow for adjustment. However, in order to adjust those shock absorbers, the rider has to in all likelihood turn the snowmobile over and manually rotate the shock absorber to a given height. And if after adjustment, the rider still feels he is not getting an optimal cushioned ride, he has to yet again stop the snowmobile, turn it over, and readjust the shock absorbers. Needless to say, such stop and go, not to mention adjustment of the shock absorbers by trial and error, is both time consuming and frustrating for the rider.

With reference to FIG. 2, the suspension system of the present invention snowmobile is shown. As illustrated, body 4 of the vehicle, shown by the dotted line 4b, is positioned relative to frame 6 of the vehicle. Taking away all of the linkages and connecting members that are not necessary for the understanding of this invention, FIG. 2 shows body 4 to be connected to frame 6 by means of two fluid actuated devices 14 and 16, otherwise also referred to as fluid driven cylinders. As shown, each of cylinders 14 and 16 has a first end 14a and 16a, respectively, connected to body 4. The respective connection points to the body of the snowmobile by the corresponding fluid actuated cylinders, for the exemplar embodiment shown in FIG. 2, are coincident with guiding wheels 18 and 20. At least one other guiding wheel, namely 22, is shown in the exemplar embodiment of the snowmobile of FIG. 2. To effect movement of belt 30, a drive wheel 24 driven by either a drive belt or gear is shown.

As illustrated, belt 30 is mounted about slide tracks 8 and is guided by the various guide wheels and driven by drive wheel 24 to effect movement of the snowmobile. Further with respect to fluid actuated cylinders 14 and 16, note that each of those devices has a second respective end 14b and 16b moveably coupled to frame 6, and therefore slide tracks 8. For the embodiment illustration of FIG. 2, assume that slide tracks 8 are part of frame 6. Further note that although fluid driven cylinders 14 and 16 are shown to be positioned in an offset position, the way in which those cylinders are positioned relatively to body 4 and frame 6 is not of import to this invention, insofar as those cylinders can be positioned in numerous ways, for different embodiments. Furthermore, note that although two fluid driven cylinders are shown, in actuality only one or additional similar cylinders may also be used.

Further with respect to FIG. 2, note that each of cylinders 14 and 16 is provided with at least one inlet/outlet port 14c and 16c, respectively, to which corresponding fluid conduits 26 and 28 are communicatively connected. As shown, conduits 26 and 28 are also communicatively connected to fluid stores 30 and 32, respectively. Fluid stores 30 and 32 each act as a reservoir of a fluid. For this invention, fluid is defined to encompass at least air, different gases, hydraulic oil and/or other incompressible liquids.

For the exemplar vehicle of FIG. 2, spliced to fluid conduits 26 and 28 are respective throttle valves 34 and 36. These valves, as is well known, control the amount of fluid provided to respective fluid cylinders 14 and 16. The operation of throttle valves 34 and 36 may be controlled by a processor 38. A more detailed discussion of the operation of throttle valves 34 and 36, as well as the overall operation of the system, is given infra.

To provide the requisite pressure to fluid stores 30 and 32, a compressor 40, by way of a conduit 42, outputs pressurized fluid to fluid stores 30 and 32. For the exemplar embodiment shown in FIG. 2, to regulate the amount of pressure in fluid stores 30 and 32, respective pressure regulators 44 and 46 are interposed between conduit 42 and the respective input port of the fluid stores. Thus, in the case of air being the fluid of choice, pressurized air could be pumped from compressor 40 into fluid stores 30 and 32, which in this instance act as air tanks. The pressurized air is then provided, and controlled by throttle valves 34 and 36, to fluid cylinders 14 and 16, which in this instance are air driven cylinders, to control the distance separating body 4 and frame 6, i.e., slide tracks 8.

In other words, the distance separating body 4, as for example from the line designated 4b thereof, to slide tracks 8 which via belt 30 is in contact with the ground, can be varied by adjusting the amount of fluid provided to fluid cylinders 14 and 16, either independently or in combination. Thus, body 4 and frame 6, or slide track 8, are movable relative to each other by the amount of fluid provided to fluid cylinders 14 and 16. Putting it differently, the stiffness of fluid cylinders 14 and 16 can be varied to compensate for different weights being placed on body 4, with respect to the relationship between body 4 and frame 6. Thus, irrespective of the weight of the rider, or riders, placed onto body 4, the suspension of the instant invention is able to compensate for such variants in weight by simply adjusting the amount of fluid, pressurized or otherwise, in fluid cylinders 14 and 16. And this adjustment can be effected in a real time basis, by the rider, either when he first sits on the snowmobile or when the vehicle is in movement.

To elaborate, further reference FIG. 2. There, a sensor 48 provided in snowmobile 2 is shown to be positioned relative to body 4 and frame 6, so as to be able to monitor the relative position of body 4, at least with respect to its base line 4b, to frame 6, or slide tracks 8. Such monitored signal is provided to processor 38 which can output the received signal to a gauge or readout 50 for the rider. The rider in turn has the option of manually actuating either compressor 40 or regulator valves 44 and 46 (and possibly throttle valves 34 and 36) to adjust the amount of fluid supplied to fluid cylinders 14 and 16.

Alternatively, the rider has the option of letting processor 38 automatically adjust the amount of clearance body 4 has with respect to frame 6 by allowing processor 38 to regulate the different operations of compressor 40, regulator valves 44 and 46, as well as throttle valves 34 and 36. Processor 38 does this in receipt of the output signal from sensor 48, and in fact can continuously adjust the amount of fluid provided to fluid cylinders 14 and 16 in response to the output signal from sensor 48 which continuously varies if the snowmobile is in movement. By thus continuously varying the amount of fluid provided to fluid cylinders 14 and 16, provided that a presumed optimal cushioned ride or threshold has been preset by the rider, an optimal cushioned ride is maintained, irrespective of the type of movement of vehicle 2. The rider can override the feedback operation of processor 38 by manually adjusting, at any time, the stiffness of his ride by adjusting the amount of fluid being provided to fluid cylinders 14 and 16, either empherically or by viewing the readout from gauge 50.

In addition to sensing the relative movement between body 4 and slide tracks 8, the present invention suspension system can optionally mount another sensor 53 to vehicle 2 for measuring the weight placed on body 4, such as for example by the rider or riders. Upon sensing this weight, sensor 53 provides an output signal to processor 38, which then automatically adjusts the relative distance separating body 4 and frame 6 by regulating the amount of fluid provided to fluid cylinders 14 and 16, thereby effecting the optimum ride for the given weight sensed. The presumed optimal cushioned ride for a given weight of course can be preset or predetermined.

As is well known, snowmobiles have skis for steering. One such ski is shown in FIG. 2 as 52. To have stabilized steering, the exemplar snowmobile of FIG. 2 has movably coupled to ski 52 a fluid actuated device 54 similar to the fluid actuated cylinders discussed above. To control the operation of fluid actuated cylinder 54, fluid is provided thereto per its inlet/outlet port 54c by way of a fluid conduit 56, which has attached thereto a throttle valve 58. Fluid conduit 56, similar to the earlier fluid conduits, is connected to a fluid store 60. The amount of pressure or fluid provided to fluid store 60 is likewise provided thereto by compressor 40 via conduit 42. A regulator valve 62 is interposed between conduit 42 and fluid store 60 for regulating the pressure of the fluid input thereto. By thus provisioning the steering mechanism of snowmobile 2 with an adjustable fluid actuator, the steering is controlled and stabilized. As before, the amount of fluid, and/or the pressure provided to fluid cylinder 54, can be adjusted by processor 38 on a real time basis, by means of a feedback circuit that senses the pressure ski 52 is subjected to, as well as the types of movement such as sharp cornering, being effected on the steering mechanism. As before, the amount of fluid provided to fluid cylinder 54 can be manually regulated by the rider.

One further point with respect to the FIG. 2 embodiment. Note that even though a compressor, and various valves, are illustrated to be used in the suspension system thereof, it should be appreciated that, in certain circumstances, no such valves or compressor are necessary, as a fluid store that is under a predetermined amount of pressure can be used. In those instances, throttle valves may be provided to allow fluid to traverse between an air cylinder and a fluid store in a regulated manner, so that as more pressure is being applied to the air cylinder (which may be due to forces acting on the slide tracks resulting from the weight of body 4 and any rider thereon as well as the movement of the vehicle), more fluid is supplied to the air cylinder to compensate for the reactive forces to thereby maintain the desired stiffness and the desired ride. The same is true with respect to the earlier discussion of the operation of the FIG. 2 suspension system in that the weight of the rider or riders on body 4 causes a counter reaction by the air cylinders to thereby provide an optimal cushioned ride for the rider.

FIG. 3 is perspective view of an exemplar frame 6 of the instant invention snowmobile illustrating in particular the suspension system thereof. As shown, slide tracks 8a and 8b are coupled to frame 6 by conventional means such as links, rods, nuts and bolts. Frame 6 in turn is comprised of support bars 56a and 56b that support a spindle about which guide wheels 20a and 20b are mounted. For the exemplar embodiment frame of FIG. 3, two torsion springs 58a and 58b are mounted about the spindle of guiding wheels 20a and 20b. Also mounted to this spindle is one end of fluid actuated cylinder 16, which other end is mounted to the base of frame 6. In place of torsion springs 58a and 58b, it should be appreciated that rigid rods that couple the spindle to the lower portion of frame 6 may also be used. Such rigid rods would in essence be positioned relatively in parallel to support bars 56a and 56b.

Further shown in the exemplar frame 6 of FIG. 3 are additional support bars 60a and 60b that, along with a frontal support rod 62, provide rigidity to frame 6. As shown, mounted to frontal support rod 62 is the first end of fluid actuated cylinder 14, whose other end is connected to a lower support bar of frame 6. Thus positioned, fluid actuated cylinders 14 and 16 provide support to the body of the snowmobile which is positioned thereover. Note that for the sake of simplicity of illustration, the inlet/outlet ports of fluid actuated cylinders 14 and 16 are not shown in the FIG. 3 embodiment.

The construction of an exemplar fluid actuated of the instant invention is shown in greater detail in FIGS. 4a and 4b. For this discussion, assume that the fluid actuator cylinder of FIGS. 4a and 4b represents fluid actuator cylinder 14 shown in FIG. 2 so that the same components are designated with the same numbers. As shown, fluid actuated cylinder has a first end 14a and a second end 14b. Further shown is the inlet port 14c through which fluid is provided to and taken out of fluid cylinder 14. As best shown in FIG. 4b, a portion of the fluid actuated cylinder comprises a shock isolator 62 having portions 62a and 62b that interact with each other on the load. As best shown in FIG. 4a, a rubber isolator such as that made by the Firestone company under part No. 7010 is integrated about the upper portion of portion 62a. This rubber isolator, designated 64 in FIG. 4a, is attached to portion 62b by means of a threaded portion 66. The upper end of isolator 64 in turn is coupled to a collar 68 of portion 62a. Needless to say, isolator 64 is secured to body 62 in a gas-tight fashion so that any fluid provided therein remains in the interior of isolator 64. Moreover, it should be noted that isolator 64 is made of a rubber that has a sufficiently strong characteristic so that if sufficient fluid, pressurized or otherwise, is provided therein, end 14a and end 14b are movable relative to each other by the expansion of isolator 64. The amount of isolation, or stiffness, provided is dependent on the amount of fluid input to the chamber 70 of isolator rubber 64. Thus, when filled with fluid, piston 72 of absorber 62 is moved relative to end 14b, thereby effecting an extension of fluid actuated cylinder 14. For the embodiment shown in FIG. 4a, the fluid used could be either air or gas. Of course, properly reconfigured, instead of a gas or air actuated device, fluid actuator cylinder 14 could be driven by hydraulic oil and/or other incompressible fluids.

FIG. 5 illustrates another aspect of the instant invention snowmobile. In particular, FIG. 5 illustrates the equipping of the snowmobile of the instant invention with an anti-lock braking system (ABS). As shown, drive wheel 24 is driven by a drive belt 74 which is in turn driven by a wheel, not shown, coupled to a disc plate 76. Plate 76 is connected to the driving gears of a transmission 78 of the vehicle that translates the movement of an engine, not shown. To effect the ABS system, a brake mechanism 80 is mounted relatively to transmission 78 to be in braking relationship with disc plate 76. The fluid provided to operate brake pad 80 is input from a fluid conduit 82, which is connected to a solenoid valve unit 84. Valve unit 84 in turn is connected to a master cylinder, not shown, and operatively connected to an actuator 86, which may be mounted to the handle of the snowmobile. For feedback, a processor controller 88, which may actually be incorporated as part of main processor 38, is used.

The reason that ABS braking is advantageous for the instant invention snowmobile is that drive belt 38 which makes actual contact with the snow usually is packed with snow, when the vehicle is moving. Accordingly, there are instances where when sudden stops are desired, skidding and indeed overturning of the vehicle occur. By incorporating an ABS system in the present invention snowmobile, the amount of brake pressure that is applied to brake pad 80 is limited and brake slippage is allowed. Thus, the snow that is packed between adjacent ribs of belt 30 is thrown off when the rider actuates the brake system. As a consequence, better traction and thereby better control are obtained by the ABS system equipped snowmobile of the instant invention.

Insofar as the instant invention is subject to many variations, modification and changes in detail, it is the intention of the inventors that all matters described throughout this specification and shown in the accompanying drawings be interpreted as illustrative only and not in a limiting sense. Accordingly, it is intended that this invention be limited only by the spirit and scope of the hereto appended claims.

The invention claimed is:

1. In a snowmobile having a body onto which at least one rider rides, said body being coupled to a frame supported by slide tracks, a system for maintaining a distance between said body and said slide tracks to provide optimal riding comfort for said rider, comprising:
   at least one fluid actuated device operatively interposed between said body and said slide tracks;
   at least one fluid containing means for storing fluid to be used for actuating said fluid actuated device;
   conduit means connecting said fluid containing means to said fluid actuated device;
   valve means interposed between said fluid containing means and said fluid actuated device, said valve means actuable to effect a selective open path between said fluid containing means and said fluid actuated device so that said fluid actuated device can operate to move said body and said slide tracks relative to each other for effectuating said distance;
   a processor; and
   at least one sensor provided in the snowmobile positioned relative to said frame and said slide tracks to monitor the position of said body relative to a base line at said frame, said sensor providing monitored signals to said processor to at least display the monitored signal to a gauge on said snowmobile.

2. The system of claim 1, wherein said valve means is responsive to at least the weight of said rider supported by said body for moving said body and said slide tracks relative to each other to vary said distance separating said body and said slide tracks, thereby providing the optimal riding comfort for said rider.

3. The system of claim 1, wherein said fluid actuated device comprises a gas or air actuated cylinder; and
   wherein said fluid containing means stores compressed air or gas for usage by said fluid actuated devices.

4. The system of claim 1, wherein said fluid actuated device comprises a hydraulic cylinder; and
   wherein said fluid containing means stores hydraulic oil or other incompressible liquids for actuating said cylinder.

5. The system of claim 1, wherein said sensor determines the forces acting on said slide tracks including at least the weight of said rider; and
   wherein the monitored signals received by said processor from said sensor is representative of at least the forces acting on said slide tracks in reaction to the weight of said rider, said processor further communicatively connected to said valve means so that, in receipt of the signals from said sensor, said processor sends a command signal to said valve means to selectively provide fluid to said fluid actuated devices to effectuate said distance.

6. The system of claim 1, further comprising:
   switch means situated on said body to be within easy reach of said rider that enables said rider to selectively actuate said fluid actuated device to adjust said distance.

7. The system of claim 1, further comprising:
   an other sensor located on said snowmobile for sensing the weight of said rider, wherein upon sensing the weight. said other sensor providing a weight signal to said processor so that said processor can utilized said sensed weight as a reference for providing fluid to said fluid actuated device to automatically adjust said distance.

8. The system of claim 1, wherein said snowmobile has at least one ski, said system further comprising:
   at least one fluid actuated device connecting said ski to said body, said fluid actuated device connecting said ski to said body being effective for stabilizing the movement of said ski.

9. The system of claim 8, further comprising:
   a feedback circuit for sensing the pressure the ski is subjected to and the movements to said ski, and sending the sensed pressure and movements to said processor so that the pressure of said fluid actuated device connecting said ski to said body is controlled in real time by said processor.

10. The system of claim 1, further comprising:
    at least two fluid actuated devices operatively interposed between said body and said slide tracks.

11. In a snowmobile having a body onto which at least one rider rides, said body being coupled to a frame supported by slide tracks, a method of maintaining a distance between said body and said slide tracks to provide optimal riding comfort for said rider, comprising the steps of:
    interposing at least one fluid actuated device between said body and said slide tracks;
    provisioning at least one fluid store means for storing fluid to be used for actuating said fluid actuated device;
    connecting said fluid store means to said fluid actuated device; and
    interposing valve means between said fluid store means and said fluid actuated device;
    monitoring the position of said body relative to a base line at said frame;
    providing monitored signals to a processor;
    displaying the monitored signal to at least one gauge on said snowmobile; and actuating said valve means based on the monitored signals to effect a selective open path between said fluid store means and said fluid actuated device so that said fluid actuated device can operate to move said body and said slide tracks relative to each other for effectuating said distance.

12. The method of claim 11, further comprising the steps of:
sensing at least the weight of said rider; and
actuating said valve means in response to at least the weight of said rider for moving said body and said slide tracks relative to each other to vary said distance separating said body and said slide tracks.

13. The method of claim 11, wherein said snowmobile has at least one ski, said method further comprising the step of:
connecting said ski to said body by at least one fluid actuated device for stabilizing the movement of said ski;
sensing the pressure the ski is subjected to and the movements to said ski, and
sending the sensed pressure and movements to said processor so that the pressure of said fluid actuated device connecting said ski to said body is controlled in real time by said processor.

* * * * *